United States Patent [19]
Reihlen et al.

[11] Patent Number: 5,467,649
[45] Date of Patent: Nov. 21, 1995

[54] MASS FLOW SENSOR HAVING A MEASURING ELEMENT ARRANGED ON A MEMBRANE RETAINED ON A MONOCRYSTALLINE SILICON WAFER

[75] Inventors: Eckart Reihlen; Jiri Marek, both of Reutlingen; Frank Bantien, Ditzingen; Guenther Findler, Stuttgart; Michael Offenberg, Tuebingen; Josef Kleinhans, Vaihingen; Uwe Konzelmann, Asperg; Botho Ziegenbein, Reutlingen, all of Germany

[73] Assignee: Robert Bosch GmbH, Stuttgart, Germany

[21] Appl. No.: 278,342

[22] Filed: Jul. 21, 1994

Related U.S. Application Data

[63] Continuation of Ser. No. 202,408, Feb. 25, 1994, abandoned.

[30] Foreign Application Priority Data

Feb. 25, 1993 [DE] Germany ............... 43 05 797.7
Nov. 13, 1993 [DE] Germany ............... 43 38 890.6

[51] Int. Cl.⁶ .................................................. G01F 1/68
[52] U.S. Cl. ............................... 73/204.26; 73/204.23
[58] Field of Search ........................... 73/204.23, 204.26

[56] References Cited

U.S. PATENT DOCUMENTS

| | | | |
|---|---|---|---|
| 4,594,889 | 6/1986 | McCarthy | 73/204.26 |
| 4,624,137 | 11/1986 | Johnson et al. | |
| 4,624,138 | 11/1986 | Ono et al. | 73/204.26 |
| 4,677,850 | 7/1987 | Miura et al. | |
| 4,841,769 | 6/1989 | Porth et al. | 73/204.26 |
| 4,888,988 | 12/1989 | Lee et al. | 73/204.26 |

FOREIGN PATENT DOCUMENTS

| | | |
|---|---|---|
| 0330105 | 8/1989 | European Pat. Off. |
| 2527505 | 1/1976 | Germany. |
| 4106287 | 4/1992 | Germany. |

Primary Examiner—Richard Chilcot
Assistant Examiner—Harshad Patel
Attorney, Agent, or Firm—Kenyon & Kenyon

[57] ABSTRACT

A mass flow sensor includes a measuring element arranged on a membrane that is clamped in a frame. The sensor is formed by introducing a recess into a silicon wafer. Through the application of a recess having perpendicular walls, the thickness of the frame can be reduced, thus allowing the required surface area of the wafer to also be reduced.

3 Claims, 2 Drawing Sheets

MASS FLOW SENSOR HAVING A MEASURING ELEMENT ARRANGED ON A MEMBRANE RETAINED ON A MONOCRYSTALLINE SILICON WAFER

CROSS-REFERENCE TO RELATED APPLICATIONS

This application is a continuation of U.S. application Ser. No. 08/202,408 filed on Feb. 25, 1994 now abandoned.

FIELD OF THE INVENTION

The present invention relates to mass flow sensors. More specifically, the present invention relates to a mass flow sensor having a more space-efficient structure.

1. Background of the Invention

A mass flow sensor having a measuring element arranged on a membrane, with the measuring element exhibiting a higher temperature than the medium whose flow is to be sensed, is described in the published European No. 0 330 105 A2. The intensity of the flow of the medium is measured by measuring the transfer of heat from the measuring element to the medium. The membrane is retained on a frame which is formed out of a monocrystalline silicon wafer by creating a recess into the rear surface of the silicon wafer. For this purpose, a silicon wafer having top and bottom surfaces with a "100" crystal orientation is used. On the bottom surface of the silicon wafer, the edges of the recess form a rectangle, each of the edges being parallel to "100" crystal directions of the silicon monocrystal. The walls of the recess are thus formed by crystal planes, of the silicon monocrystal, with "111" orientation, which form an angle of about 54.7° with the "100"-oriented bottom surface of the silicon wafer.

2. Summary of the Invention

The present invention relates to a mass flow sensor which includes a frame that is designed to be especially narrow. Therefore, the surface area required for the frame becomes especially small, making it possible to fabricate more mass flow sensors per wafer.

The required surface area becomes particularly small when a "110"-oriented silicon wafer is used, since in this case, all four side walls are arranged in a direction perpendicular to the top surface of the wafer. When a "100"-oriented wafer is used, the use of a recess whose edges generally form a hexagon, as opposed to a rectangular recess, allows further surface area savings to be achieved. Furthermore, the membrane thus formed has a symmetrical design.

DETAILED DESCRIPTION OF THE DRAWINGS

Figure 1:
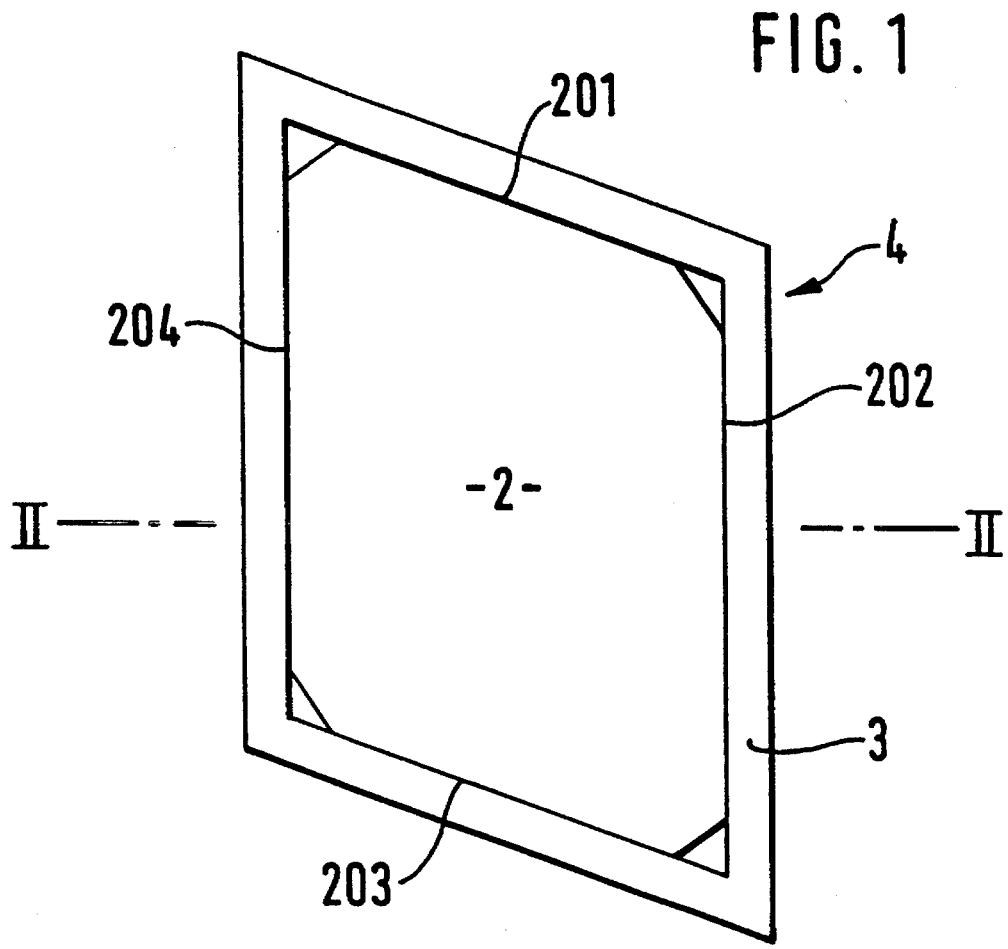
FIGS. 1 and 2 show a first exemplary embodiment of the present invention having a "110"-oriented silicon wafer.
Figure 2:
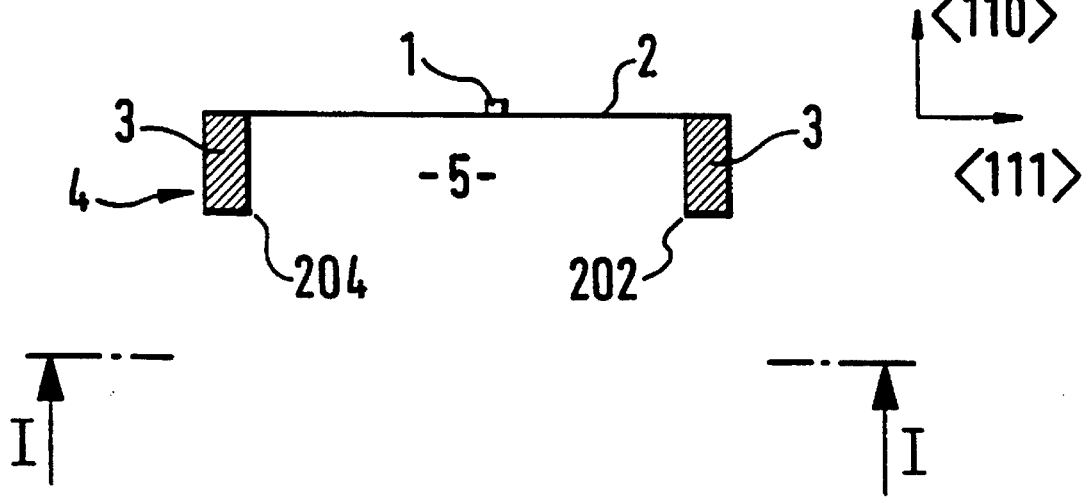

FIG. 1 is a bottom view of a first embodiment of a mass-flow sensor according to the present invention. FIG. 1 corresponds with the view from the line I—I of FIG. 2. FIG. 2 is a cross-sectional view of the sensor of FIG. 1, along the line II—II. The sensor has a frame 3 on which a membrane 2 is clamped. A measuring element 1 is situated on the top surface of the membrane 2. A medium flows along the top surface of the membrane 2. The measuring element 1 is maintained at a temperature that is higher than the temperature of the medium. The intensity of the flow of the medium can be determined by measuring the transfer of heat from the measuring element 1 to the medium. The measuring element 1 can include a temperature-dependent resistor which is heated by a current and whose resistance is measured. The measuring element 1 can also include a heater and additional temperature sensors.

Fabrication of the mass flow sensor of the present invention starts out with a silicon wafer 4. A thin layer of material is deposited onto the top surface of the silicon wafer 4 to form the membrane 2. The membrane 2 can be comprised of a silicon layer, as well as dielectric layers of silicon oxide or silicon nitride. In addition, structures comprising the measuring element 1 are applied. A recess 5 is then formed in the bottom side of the silicon wafer 4 by applying an etching mask. The etching mask is an etch-resistant layer which is removed in those regions where the silicon wafer 4 is to be etched. When an etching medium is applied, in this case a liquid anisotropic etching solution, such as a sodium or potash lye, only the exposed silicon regions are etched away. The part of the silicon wafer 4 that is not etched away forms a frame 3.

When the side walls of the recess 5 that are formed by the mask etching process are not at right angles to the bottom surface of the silicon wafer 4, the frame 3 which results is wider at the top side of the silicon wafer 4 than on the bottom side. In this case, given a specific desired size of the membrane 2, the entire silicon wafer 4 must be made correspondingly larger to guarantee that the frame 3 has a given minimum thickness at the bottom side of the wafer 4. When the side walls of the recess 5 are perpendicular to the bottom surface of the silicon wafer 4, the frame 3 which results has the same thickness at the bottom side of the wafer 4 as on the top side. In this case, a smaller surface area is needed for the silicon wafer 4, for a given predetermined membrane size, than in the case of non-perpendicular side walls.

Typically, a plurality of mass-flow sensors are fabricated simultaneously on a silicon wafer. The individual mass-flow sensors are then separated by dicing the silicon wafer. The saw cut used to separate the sensors is expediently perpendicular to the top surface of the wafer. Because the side walls of the recess 5 are parallel to the cutting surfaces, as shown in FIG. 2, the offset of the saw cut from the side walls can be kept especially small when the silicon wafer is diced into individual mass flow sensors.

The silicon wafer 4, into which the recess 5 is formed, has top and bottom surfaces that are oriented in a "110" crystal direction. On the bottom surface of the silicon wafer 4, the recess 5 has a first edge 201 which forms a 109.5° angle with a second edge 202. The second edge 202 forms a 70.5° angle with a third edge 203. The third edge 203 forms a 109.5° angle with a fourth edge 204 which, in turn, forms a 70.5° angle with the first edge 201. Each of the four edges 201–204 lies in a "111"-oriented crystal plane of the silicon monocrystal, which is oriented perpendicularly to the "110"-oriented top surface of the silicon wafer 4.

Figure 3:
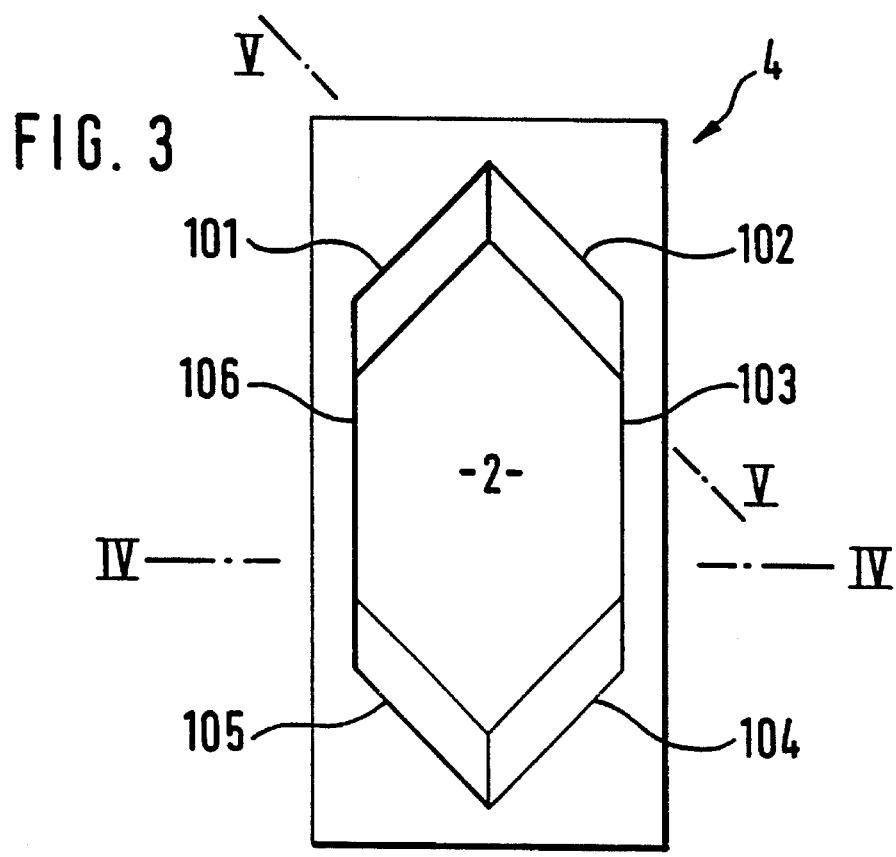
FIGS. 3 through 5 show a second exemplary embodiment of the present invention having a "100"-oriented silicon wafer.
Figure 4:
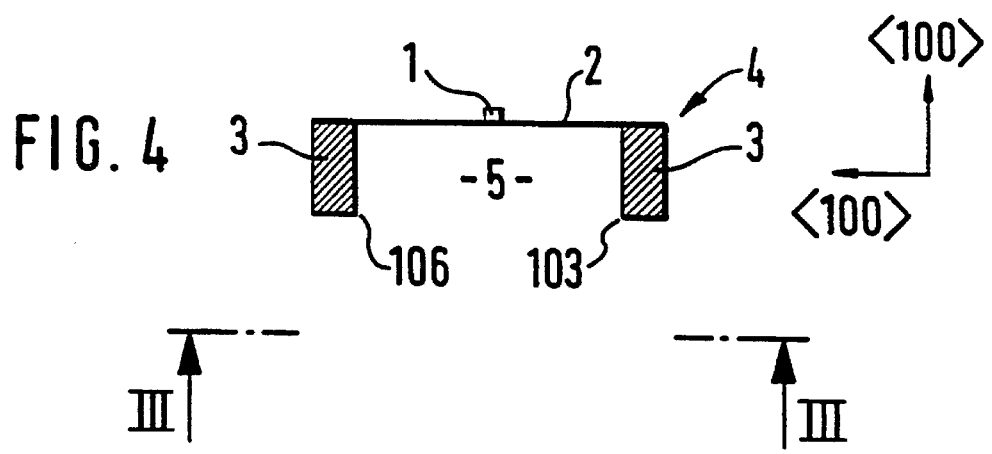
Figure 5:
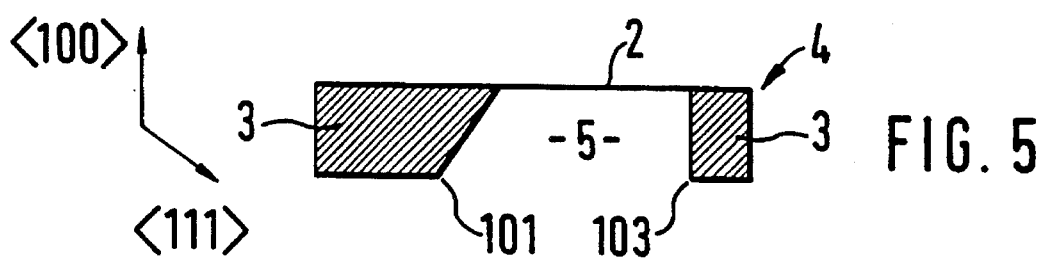

FIGS. 3, 4 and 5 depict another exemplified embodiment of the mass flow sensor according to the present invention. FIG. 4 is a cross-sectional view of the wafer 4 along the line IV—IV of FIG. 3. FIG. 5 is a cross-sectional view of the wafer 4 along the line V—V of FIG. 3. FIG. 3 is a bottom view of the sensor from the line III—III of FIG. 4. Like elements shown in FIGS. 1 and 2 are shown in FIGS. 3–5 with the same reference numerals and perform the same functions.

In contrast to the embodiment shown in FIGS. 1 and 2, the embodiment of FIGS. 3–5 comprises a recess 5, etched into the bottom side of the silicon wafer 4, which has a hexagonal shape. A first edge 101 forms a 90° angle with a second edge 102. The second edge 102 forms a 135° angle with a third edge 103. The third edge 103 forms a 135° angle with a fourth edge 104. The fourth edge 104 forms a 90° angle with a fifth edge 105. The fifth edge 105 forms a 135° angle with a sixth edge 106 which, in turn, forms a 135° angle with the first edge 101.

The top and bottom surfaces of the silicon wafer 4 of FIGS. 3–5 are oriented in the 100-direction. As can be inferred from FIG. 4, the edges 103 and 106 each lie on "100"-oriented planes of the silicon monocrystal, which are aligned perpendicularly to the "100"-oriented top and bottom surfaces of the silicon wafer 4. The four edges 101, 102, 104 and 105 each lie on "111"-oriented crystal planes, which form an angle of about 54.74° with the "100"-oriented top surface of the silicon wafer 4. A corresponding side wall, which borders edge 101, is shown in FIG. 5.

Since the frame 3 can be made very thin in this case as well, at least in the vicinity of the edges 103 and 106, it is possible, in this case, to produce a sensor occupying a smaller surface area than in the case where all side walls are oriented at an oblique angle with the bottom side. Consequently, in the fabrication of a plurality of sensors on a silicon wafer, the utilization of the top surface of the wafer is improved, and thus achieving a reduction in the costs per individual sensor.

What is claimed:

1. A mass flow sensor for measuring the flow of a medium having a first temperature, the sensor comprising:

a membrane;

a measuring element arranged on the membrane, the measuring element being at a second temperature higher than the first temperature, the measuring element measuring the flow of the medium based upon a transfer of heat from the measuring element to the medium; and a frame for retaining the membrane, the frame including a monocrystalline silicon wafer having a recess with side walls that are perpendicular to a bottom surface of the silicon wafer, wherein:

the bottom surface of the silicon wafer has a 100 orientation; and the recess is in a rear portion of the silicon wafer, and has edges which form a generally hexagonal-shaped opening on the bottom surface of the silicon wafer, with at least one of the edges lying on a plane with a 111 orientation.

2. The mass flow sensor according to claim 1, wherein:

the recess has first, second, third, fourth, fifth and sixth edges, the first and second edges forming a 90° angle, the second and third edges forming a 135° angle, the third and fourth edges forming a 135° angle, the fourth and fifth edges forming a 90° angle, and the fifth and sixth edges forming a 135° angle;

the planes form an angle of approximately 54.7° with the bottom surface of the silicon wafer; and the third and sixth edges each lie on a plane with a 100 orientation perpendicular to the bottom surface of the silicon wafer.

3. A mass flow sensor for measuring the flow of a medium having a first temperature, the sensor comprising:

a membrane;

a measuring element arranged on the membrane, the measuring element being at a second temperature higher than the first temperature, the measuring element measuring the flow of the medium based upon a transfer of heat from the measuring element to the medium; and a frame for retaining the membrane, the frame including a monocrystalline silicon wafer having a recess with side walls that are perpendicular to a bottom surface of the silicon wafer, wherein:

the bottom surface of the silicon wafer has a 110 orientation; and the recess has first, second, third and fourth edges which form a parallelogram-shaded opening on the bottom surface of the silicon wafer and which lie on planes with a 111 orientation perpendicular to the bottom surface of the silicon wafer, with the first and second edges forming an angle of approximately 109.5°, the second and third edges forming an angle of approximately 70.5°, and the third and fourth edges forming an angle of approximately 109.5°.

* * * * *